3,712,939
METHOD FOR RECOVERING TANTALUM AND/OR COLUMBIUM

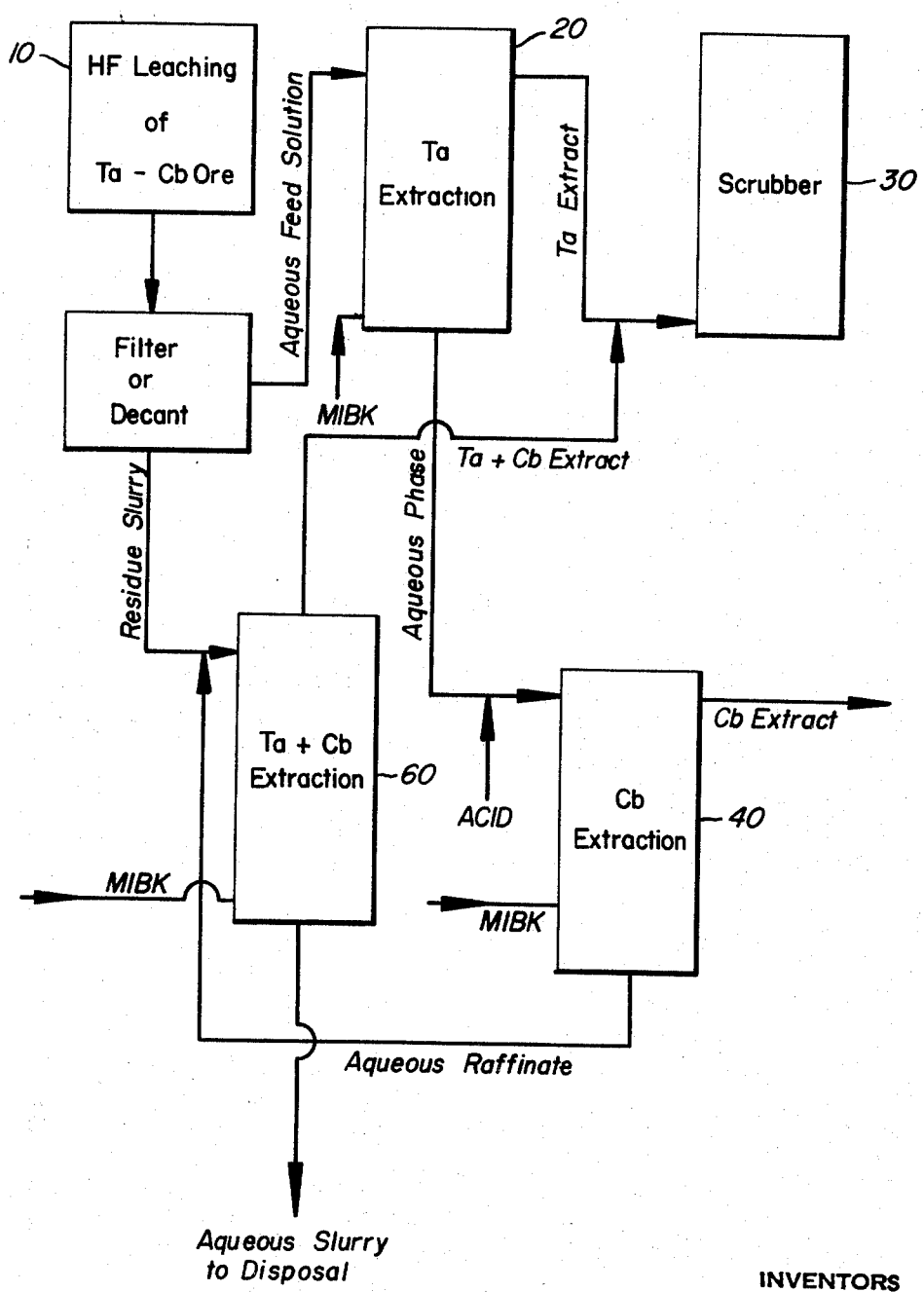

Raymond H. Capps and Gorden S. Harman, Marietta, Ohio, assignors to Union Carbide Corporation, New York, N.Y.
Filed Mar. 29, 1971, Ser. No. 128,706
Int. Cl. C22b 59/00
U.S. Cl. 423—63    1 Claim

ABSTRACT OF THE DISCLOSURE

Method for recovering tantalum and/or columbium values from insoluble residues obtained from the acid leaching of columbium and/or tantalum containing ore by acid treating the residues and contacting the resulting slurry with methyl-isobutyl ketone.

---

This invention relates to the recovery of tantalum and/or columbium from ores. More particularly the present invention relates to the recovery of tantalum and/or columbium values from low grade ores.

Ores contaiaining columbium and/or tantalum have been processed in the past by leaching the ores with hydrofluoric acid to obtain soluble columbium and tantalum values, i.e. $H_2TaF_7$ and $H_2CbOF_5$ with the formation of an undissolved residue. The undissolved residue invariably contains some dissolved columbium and tantalum due to entrainment of liquor with the solids and, particularly when low grade ores are used, the proportion of dissolved columbium and tantalum remaining in the residue constitutes a serious economic loss. Conventional methods of recovering dissolved values from high grade-low residue ores, such as washing and/or repulping with an aqueous stream, when applied to high residue ores, yield low overall recovery, generate large volumes of liquor low in tantalum and columbium values and may require additional filtration or decantation steps.

It is therefore an object of the present invention to provide a solids residue-treating process by which improved recoveries of tantalum and/or columbium are obtained with low volume generation of aqueous streams low in columbium and tantalum values and a minimum of time-consuming and costly filtration or decantation steps.

Other objects will be apparent from the following description and claims taken in conjunction with the drawing which shows a schematic representation of a process in accordance with the present invention.

In the practice of the present invention and with reference to the drawing a columbium and tantalum bearing ore, for example one containing from 3 to 20% $Ta_2O_5$ and 10 to 30% $Cb_2O_5$, is milled and introduced into a digestion tank 10. Hydrofluoric acid is also introduced into the digestion tank 10 and the ore is acid leached whereby columbium and tantalum values are dissolved. The contents of the digestion tank are filtered or decanted as indicated at 15 to provide an aqueous leach liquor solution containing columbium and tantalum values and a residue cake or slurry which also contains entrained leach liquor bearing dissolved tantalum and columbium. The aqueous solution is fed to a multi-stage extraction cascade 20 wherein tantalum values are conventionally, selectively extracted by liquid-liquid extraction techniques using, for example, methyl-isobutyl ketone (MIBK) as the extractant media. There is a relatively low free acid content in the aqueous solution e.g. about 0.5–3 normal. The extracted tantalum values are conventionally purified in a scrubber 30. The aqueous phase from extraction cascade 40 wherein columbium values are conventionally extracted by liquid-liquid techniques, with additional acid such as HF, $H_2SO_4$ or HCl being added to the extent necessary, e.g. to provide free acid from about 6–12 normal, to effect extraction of the columbium values into methyl-isobutyl ketone. The aqueous raffinate from extraction vessel 40, containing substantial amounts of acid, e.g. 2–8 normal free acid, is introduced into extraction vessel 60 to which has also been introduced the residue slurry from the initial hydrofluoric acid leaching of the tantalum and columbium bearing ore. Additional acid, if necessary, to provide from 2 to 12 normal free acid, and methyl-isobutyl ketone are introduced into extraction vessel 60 and tantalum and columbium values are extracted from the residue into the methyl-isobutyl ketone phase from which they are recovered and separated by conventional techniques via the scrubber 30.

The present invention is more fully illustrated in the following example.

EXAMPLE

Tantalum and columbium bearing ore analyzing 11–13% $Ta_2O_5$ and 8–9% $Cb_2O_5$ in the amount of 10,000–12,000 lbs. was introduced into a digestion tank together with aqueous make up solution containing 9500–11,500 lbs. of hydrofluoric acid. The resulting leach liquor was filtered and introduced into a multi-stage tantalum extraction cascade together with methyl-isobutyl ketone. The leach liquor contained 30–45 grams per liter of $Ta_2O_5$ equivalent and 20–30 grams per liter of $Cb_2O_5$ equivalent. The tantalum was transferred from the aqueous to organic phase in conventional counter-current mixer-settler equipment where organic/aqueous flows were controlled to a point where practically all the tantalum was removed, and the discharged aqueous stream (tantalum raffinate) contained less than 0.4 gram per liter equivalent $Ta_2O_5$. Thus about 80% of the $Ta_2O_5$ contained in the ore fed was removed in the above described tantalum extraction cascade. The tantalum-depleted feed liquor (tantalum raffinate) containing 20–30 grams per liter equivalent $Cb_2O_5$ was acidified to 5–10 normality with HF and introduced to a second multi-stage extraction cascade where the columbium was extracted into methyl-isobutyl ketone in accordance with conventional practice. The continuous aqueous and organic flow rates were adjusted to give maximum columbium extraction efficiency depending upon the degree of acidity and concentration of $H_2CbOF_5$ in the aqueous feed stream. Columbium amounting to about 80% of the amount originally in the ore was recovered.

The filtered or decanted solid residue amounting, on a dry basis, to about 50% of the original ore weight was fed to an extractor along with sufficient tantalum and columbium depleted feed liquor from the columbium extraction cascade to make a slurry bearing about 30% solids. Methyl-isobutyl ketone was then introduced to the extractor along with additional acid to provide a normality of 2–12 normal free acid. Tantalum and columbium contained in the leach residue were transferred to the methyl-isobutyl ketone phase by a series of additions, decantations and removals of the pregnant methyl-isobutyl ketone. The organic phase from this series of mixing and decanting steps was removed, stored and introduced at a steady rate consistent with good extraction techniques to the tantalum extract stream as fed to scrubber 40 as illustrated in the drawing.

Tantalum and columbium recoveries from ore to product were thereby each increased to about 90% from 80% without the use of the extractor.

What is claimed is:
1. In the method of obtaining metal values from an ore containing at least one metal value selected from the group consisting of columbium and tantalum by leaching the ore with hydrofluoric acid to obtain an acidified liquid phase containing soluble metal values selected from the group consisting of columbium and tantalum and solids containing entrained dissolved selected metal values, and substantially separating the soluble selected metal values from the acidified liquid phase the improvement which comprises providing a free acid content of from about 2 to 12 normal in the metal value depleted acidified liquid phase and treating said solids with said acidified liquid phase to provide an acidic aqueous slurry and thereafter contacting the acidic aqueous slurry with methyl-isobutyl ketone whereby selected metal values are extracted from said solids into the methyl-isobutyl ketone.

References Cited

UNITED STATES PATENTS

| | | | |
|---|---|---|---|
| 2,953,453 | 9/1960 | Foos | 23—23 X |
| 3,117,833 | 1/1964 | Pierret | 23—19 |

HERBERT T. CARTER, Primary Examiner

U.S. Cl. X.R.

23—51 R; 423—68